(12) United States Patent
Nakata et al.

(10) Patent No.: US 9,336,050 B2
(45) Date of Patent: May 10, 2016

(54) SERVER DEVICE, LOG TRANSFERRING METHOD, AND LOG TRANSFERRING SYSTEM

(71) Applicant: FUJITSU LIMITED, Kawasaki-shi, Kanagawa (JP)

(72) Inventors: Kei Nakata, Yokohama (JP); Naohiro Tamura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 131 days.

(21) Appl. No.: 14/207,842

(22) Filed: Mar. 13, 2014

(65) Prior Publication Data

US 2014/0196042 A1 Jul. 10, 2014

Related U.S. Application Data

(63) Continuation of application No. PCT/JP2011/071732, filed on Sep. 22, 2011.

(51) Int. Cl.
*G06F 9/48* (2006.01)
*G06F 9/455* (2006.01)
*G06F 9/50* (2006.01)
*G06F 11/20* (2006.01)
*G06F 11/07* (2006.01)
*G06F 11/14* (2006.01)

(52) U.S. Cl.
CPC .......... *G06F 9/4856* (2013.01); *G06F 9/45533* (2013.01); *G06F 9/45558* (2013.01); *G06F 9/5088* (2013.01); *G06F 11/0712* (2013.01); *G06F 11/0787* (2013.01); *G06F 11/203* (2013.01); *G06F 11/1471* (2013.01); *G06F 11/1484* (2013.01); *G06F 11/2097* (2013.01); *G06F 2009/4557* (2013.01); *G06F 2009/45591* (2013.01); *G06F 2201/815* (2013.01)

(58) Field of Classification Search
None
See application file for complete search history.

(56) References Cited

U.S. PATENT DOCUMENTS

| | | | |
|---|---|---|---|
| 2002/0093582 A1 | 7/2002 | Aoki et al. | |
| 2010/0332661 A1 | 12/2010 | Tameshige | |

FOREIGN PATENT DOCUMENTS

| | | |
|---|---|---|
| JP | 2000-259434 | 9/2000 |
| JP | 2002-24048 A | 1/2002 |
| JP | 2002-207621 | 7/2002 |
| JP | 2005-117487 | 4/2005 |
| JP | 2009-075877 | 4/2009 |
| JP | 2010-277595 | 12/2010 |
| JP | 2011-008481 | 1/2011 |
| JP | 2011-076127 | 4/2011 |
| JP | 2011-159249 A | 8/2011 |

OTHER PUBLICATIONS

Japanese Office Action mailed Jun. 24, 2014 for corresponding Japanese Patent Application 2013-534556, with Partial English Translation, 10 pages.
International Search Report, mailed in connection with PCT/JP2011/071732 and mailed Dec. 27, 2011.

*Primary Examiner* — Qing Wu
(74) *Attorney, Agent, or Firm* — Fujitsu Patent Center

(57) ABSTRACT

A server device includes a virtualization control unit, a storing unit, and a transferring unit. The virtualization control unit operates a virtual machine that is a virtualized computer to control a migration of the virtual machine with another server device. The storing unit stores therein a log, in an associated manner with the virtual machine, that is created by the virtual machine. When the virtual machine is migrated to the other server device, the transferring unit transfers, to the other server device, the log of the virtual machine targeted for a migration stored in the storing unit.

3 Claims, 13 Drawing Sheets

FIG.3

| TIME STAMP | PHYSICAL SERVER NAME | LOG CONTENT |
|---|---|---|
| 12/11/2010 12:31:42 | VMhost1 | Memory error |
| 12/12/2010 22:34:12 | VMhost1 | Start failed |
| 12/13/2010 10:02:33 | VMhost2 | Stop failed |
| 12/21/2010 05:51:12 | VMhost2 | Internal error |
| 01/11/2011 01:31:02 | VMhost3 | Cpu error |

FIG.4

| MOVE SOURCE PHYSICAL SERVER NAME | MOVE VM GUEST NAME | LOG FILE |
|---|---|---|
| VMhost1 | VMguest1 | VMguest1.log |

FIG.5

| TIME STAMP | PHYSICAL SERVER NAME | LOG CONTENT | |
|---|---|---|---|
| 12/11/2010 12:31:42 | VMhost1 | Memory error | |
| 12/12/2010 22:34:12 | VMhost1 | Start failed | } T1 |
| 12/12/2010 22:02:33 | VMhost2 | Stop failed | |
| 12/21/2010 05:51:12 | VMhost2 | Internal error | } T2 |
| 01/11/2011 01:31:02 | VMhost3 | Cpu error | |
| 01/12/2011 11:31:12 | VMhost3 | Memory error | |
| 01/13/2011 01:51:05 | VMhost3 | Start failed | |
| 01/14/2011 21:32:34 | VMhost3 | Stop failed | } T3 |
| 01/14/2011 21:31:02 | VMhost4 | Internal error | |
| 01/14/2011 21:32:02 | VMhost4 | Cpu error | |
| 01/17/2011 01:31:02 | VMhost4 | Start failed | |
| 01/17/2011 07:43:12 | VMhost4 | Stop failed | |

FIG.12

| MOVE VM GUEST NAME | MOVE SOURCE PHYSICAL SERVER NAME |
|---|---|
| VMguest1 | VMhost2 |

FIG.13

| RECORD ID | VM GUEST ID | PHYSICAL SERVER | PRE-MOVE RECORD ID |
|---|---|---|---|
| 1 | 100 | B | - |
| 2 | 100 | A | 1 |
| 3 | 101 | A | - |
| 4 | 100 | B | 2 |
| 5 | 100 | A | 4 |
| 6 | 102 | B | - |
| 7 | 101 | B | 3 |

FIG.14

| RECORD ID | VM GUEST ID | PHYSICAL SERVER | LATEST HISTORY RECORD ID |
|---|---|---|---|
| 1 | 100 | A | 5 |
| 2 | 101 | B | 7 |
| 3 | 102 | B | 6 |

FIG.15

| MOVE VM GUEST NAME | MOVE DESTINATION PHYSICAL SERVER NAME |
|---|---|
| VMguest1 | VMhost2 |

SERVER DEVICE, LOG TRANSFERRING METHOD, AND LOG TRANSFERRING SYSTEM

CROSS-REFERENCE TO RELATED APPLICATIONS

This application is a continuation of International Application No. PCT/JP2011/071732, filed on Sep. 22, 2011, the entire contents of which are incorporated herein by reference.

FIELD

The embodiments discussed herein are directed to a server device, a log transferring method, and a log transferring system.

BACKGROUND

In recent years, a virtualization technology that operates virtual machines in physical servers is used. For example, in each corporation, an environment increases in which virtual machines are operated in physical servers by using virtualization software. Furthermore, in public cloud environments on the Internet or in private cloud environments in corporations, in order to efficiently use the computer resources, virtualization software is used as a basic element technology. When a physical server in which the virtualization software is running is in abnormal operations or indicates a sign of abnormality, the virtualization software has the function of moving a virtual machine running on a physical server to another physical server. This moving of a virtual machine is also referred to as "migration".

Because logs of a virtual machine are stored in a running physical server, when a virtual machine moves across multiple physical servers, each of the logs is stored in the multiple in a distributed manner. Consequently, if some malfunction occurs in the virtual machine, an administrator that manages the virtual machine needs to check the distributed logs of the virtual machine in the multiple physical servers located at multiple locations by tracking back along the move history of the virtual machine.

Accordingly, there is a proposed technology that allows log files in physical servers to be referred to by providing links to log files that are stored, in a distributed manner, in the multiple physical servers and by clicking the links via a screen on a management terminal.

Furthermore, there is also a proposed technology that moves, when a virtual machine needs to be moved to another physical server, log information from a physical server at the move source, to a management server.

Patent Document 1: Japanese Laid-open Patent Publication No. 2010-277595
Patent Document 2: Japanese Laid-open Patent Publication No. 2011-8481

However, with the conventional technology, because the logs of the virtual machine are stored in multiple servers in a distributed manner, there may sometimes be a case in which a checking operation of the logs of the virtual machine becomes complicated.

For example, with the technology for providing a link to log files, when the location of a physical server in a network is changed or when the location of a log file stored in a physical server is changed, the log file is not able to be referred to. Furthermore, with the technology that provides a link to a log file, when a malfunction occurs in a virtual machine, if a physical server that was moved in the past is not present any more or if a physical server has failed, it is not able to check logs in the physical server by going back into the past.

Furthermore, with a technology that collects, when a virtual machine is moved to another physical server, log information into a management server, the log information is separately stored in a management server and a physical server in which a virtual machine is running.

SUMMARY

According to an aspect of an embodiment, a server device includes: a virtualization control unit that controls, by operating a virtual machine that is a virtualized computer, a migration of the virtual machine with another server device; a storing unit that stores therein a log created by the virtual machine by associating the log with the virtual machine; and a transferring unit that transfers, to the other server device when the virtual machine is migrated to the other server device, a log of a virtual machine that is targeted for a migration stored in the storing unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a schematic diagram illustrating an example configuration of data in a log stored in a storing unit;
FIG. 4 is a schematic diagram illustrating an example configuration of data in a log that is to be transferred;
FIG. 5 is a schematic diagram illustrating an example of the result obtained by combining a transferred log with a log that has already been present in the storing unit;
FIG. 12 is a schematic diagram illustrating an example configuration of communication data by which a log that has not been transferred is notified;
FIG. 13 is a schematic diagram illustrating an example configuration of data in a first table;
FIG. 14 is a schematic diagram illustrating an example configuration of data in a second table;
FIG. 15 is a schematic diagram illustrating an example configuration of communication data by which a move instruction is performed;

DESCRIPTION OF EMBODIMENTS

Preferred Embodiments of the Present Invention will be explained with reference to accompanying drawings. The present invention is not limited to these embodiments. Furthermore, the embodiments can be appropriately used in combination as long as the processes do not conflict with each other.

[a] First Embodiment

Figure 1:
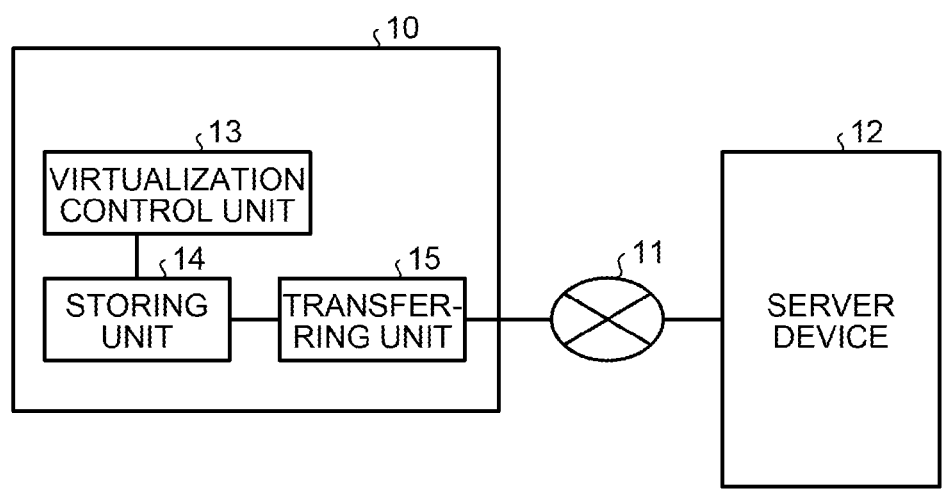
FIG. 1 is a schematic diagram illustrating the overall configuration of a system that includes a server device.

In the following, a server device 10 according to a first embodiment will be described. FIG. 1 is a schematic diagram illustrating the overall configuration of a system that includes a server device. The server device 10 is a physical server that operates a virtual machine, which is a virtualized computer, so that the server device 10 provides various services to a user. For example, the server device 10 is a server computer installed in a data center or a corporation. The server device 10 can communicate with a server device 12, which is another device, via a network 11. It is assumed that the server device 12 can also operate a virtual machine. Furthermore, it is assumed that the server device 10 and the server device 12 can migrate a virtual machine each other via the network 11. Any kind of communication network, such as the Internet, a local area network (LAN), a virtual private network (VPN), or the like, may be used as the network 11 irrespective of whether the network is wired or wireless.

As illustrated in FIG. 1, the server device 10 includes a virtualization control unit 13, a storing unit 14, and a transferring unit 15.

The virtualization control unit 13 operates a virtual machine that is a virtualized computer. For example, the virtualization control unit 13 implements a virtual environment in which a virtual machine is operated by using a virtualization technology and controls the virtual machine that is a virtualized computer. An example of this virtualization technology includes logical partitioning (LPAR) that logically divides a physical machine by using the function of hardware or includes virtualization software that logically divides a physical machine by using software. Furthermore, the virtualization control unit 13 controls a migration, between the server device 12, of a virtual machine. The virtual machine executes a process related to program, such as an application or firmware, in a virtual environment and then creates a log related to the executed process.

The storing unit 14 stores therein various kinds of information. For example, the storing unit 14 stores therein a log created by a virtual machine by associating the log with the virtual machine. This log indicates the history of the process executed by each virtual machine. For example, the log is created such that information, such as date and time at which the process was executed, a processed content, or the result of the executed process, is additionally written and then is stored in a log file. An example of the storing unit 14 includes a semiconductor memory capable of rewriting data, such as a flash memory, a non-volatile static random-access memory (NVSRAM), and the like, or a storage device, such as a hard disk, an optical disk, and the like.

When the transferring unit 15 migrates a virtual machine to the server device 12, the transferring unit 15 transfers various kinds of information on the virtual machine. For example, the transferring unit 15 transfers, to the server device 12, the log, which is stored in the storing unit 14, of the virtual machine targeted for a migration. The transferred log is stored in the server device 12. In the example illustrated in FIG. 1, because the functional configuration is illustrated, the virtualization control unit 13 and the transferring unit 15 are separately illustrated; however, for example, they also may be integrated as a single device. An example of the device includes an electronic circuit, such as a central processing unit (CPU), a micro processing unit (MPU), or the like. Furthermore, an integrated circuit, such as an application specific integrated circuit (ASIC), a field programmable gate array (FPGA), or the like may also be used as the device.

As described above, the server device 10 operates a virtual machine and stores, in the storing unit 14, a log created by the virtual machine by associating the log with the virtual machine. Furthermore, when the server device 10 migrates the virtual machine to the server device 12, which is another device, the server device 10 transfers, to the server device 12, which is the other device, the log that is stored in the storing unit and that is related to the virtual machine that is targeted for the migration. Consequently, the log related to a process, which was executed on the virtual machine previously included in a physical server that is used before the migration, is migrated to the physical server that currently operates the virtual machine. Consequently, when the log of the virtual machine is checked, it is possible to reduce the time and effort needed to additionally check the server, such as a physical server that is previously used before the migration. Thus, with the server device 10, a log of a virtual machine can be easily checked.

Furthermore, with the server device 10, because a log of the virtual machine is moved in accordance with the migration of the virtual machine, the concentrated loads applied to a management server can be reduced when compared with a case in which logs are aggregated in a management server.

[b] Second Embodiment

Figure 2:
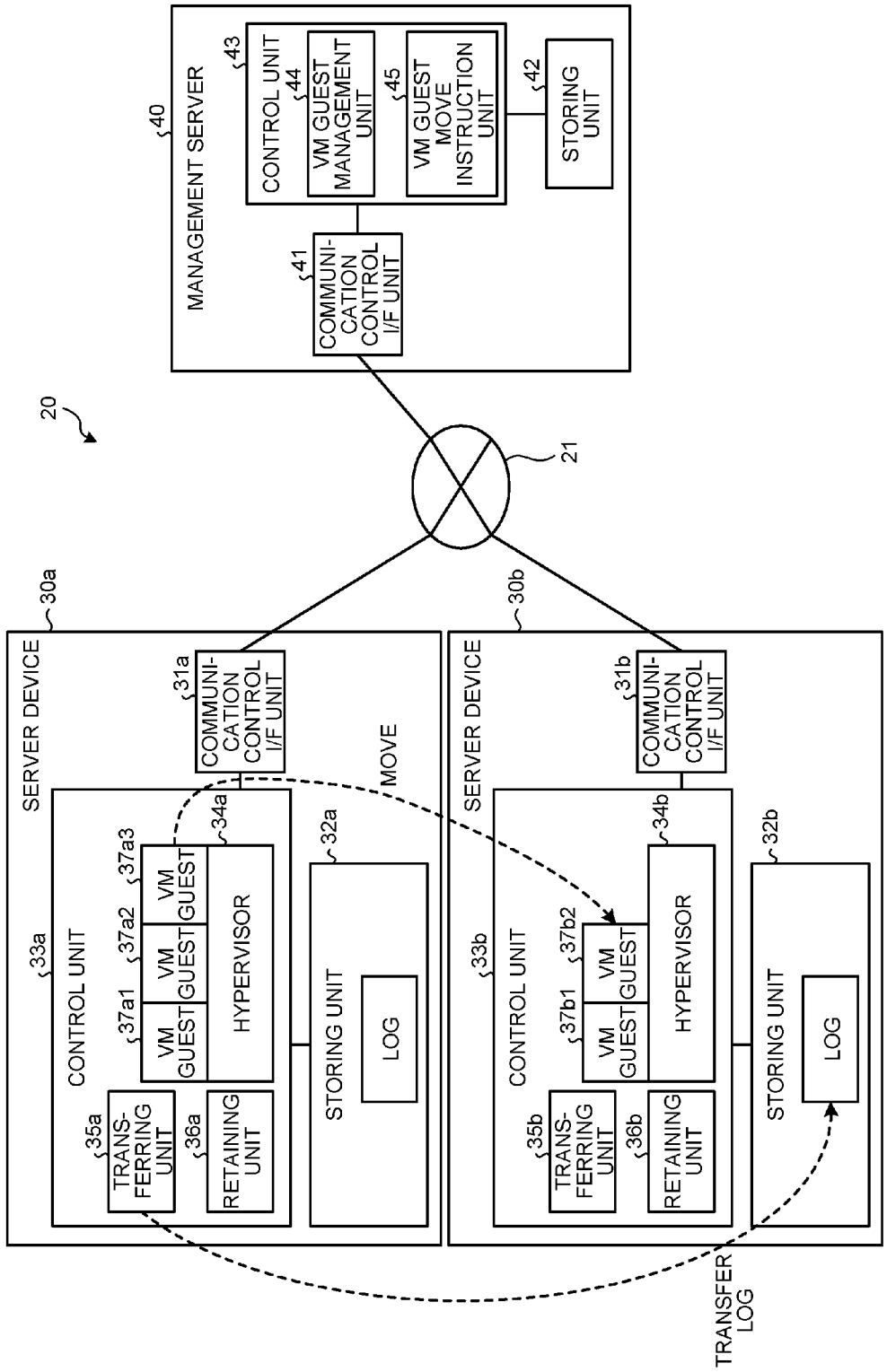
FIG. 2 is a schematic diagram illustrating an example of the functional configuration of a system according to a second embodiment.

In the following, a second embodiment will be described. In the second embodiment, a description will be given of a system 20 in which a migration can be performed on a VM guest, which is a virtual machine, among multiple server devices. FIG. 2 is a schematic diagram illustrating an example of the functional configuration of a system according to a second embodiment. The system 20 includes multiple server devices 30a and 30b and a management server 40. In FIG. 2, two server devices 30a and 30b are illustrated as an example. In the following description, when it is not necessary to distinguish the server device 30a from the server device 30b, the server device will be simply denoted as the server device 30. Elements included in the server device 30a will be denoted with suffix "a" while elements included in the server device 30b will be denoted with suffix "b" for the convenience of description. When it is not necessary to distinguish the elements in the server device 30a from the server device 30b, the elements will be indicated without suffixes. Each of the server devices 30a and 30b is connected to the management server 40 via a network 21 such that they can communicate with each other. An example of the network 21 includes any kind of communication network, such as the Internet, a LAN, a VPN, or the like irrespective of whether the network is wired or wireless.

The server devices 30 are devices that can operate VM guests, which are virtual machines, and migrate the VM guest with one of the other server devices 30. The management server 40 manages the VM guests that are running on each of the server devices 30 and sends a migration instruction related to a virtual machine to each of the server devices 30. This migration instruction includes information related to the VM guest that is targeted for a migration or includes information that indicates the move source or the move destination. In the example illustrated in FIG. 2, the number of server devices 30 is two; however, the number of server devices 30 may also be three or more. Furthermore, FIG. 2 illustrates, as an example, a single management server 40; however, the number of the management servers 40 may also be two or more.

Configuration of the Server Device

As illustrated in FIG. 2, the server devices 30a/30b includes a communication control I/F unit 31a/31b, a storing unit 32a/32b, and a control unit 33a/33b.

The communication control I/F unit 31 is an interface that includes at least one port and controls communication with other devices. For example, the communication control I/F unit 31 receives a migration instruction from the management server 40 and then outputs the migration instruction to the control unit 33. Furthermore, the communication control I/F unit 31 sends and receives, to and from the other server devices 30 and the management server 40, various kinds of information, such as information related to the VM guests 37.

The storing unit 32 stores therein various kinds of information. For example, the storing unit 32 stores therein various kinds of information needed for various kinds of control of each of the VM guests 37 by using a hypervisor 34, which will be described later. Furthermore, the storing unit 32 also stores therein, for each of the VM guest 37, a log created by a virtual machine. The log indicates the history of the process executed by each of the VM guests 37. For example, information related to the executed process is additionally written into the file and then stored in the log. The name is uniquely determined to each of the VM guests 37 such that names are not overlapped with each other. In the second embodiment, for example, log files are created for each of the VM guests 37, the combination of the "VM guest name" and ".log" is used for the file name. An example of the storing unit 32 includes a semiconductor memory that can rewrite data, such as a flash memory, an NVSRAM, and the like, or a storage device, such as a hard disk, an optical disk, and the like.

FIG. 3 is a schematic diagram illustrating an example configuration of data in a log stored in a storing unit. As illustrated in FIG. 3, the log includes items, such as the time stamp, the physical server name, the log content. The item of the time stamp is an area that stores therein the date and time at which a process was executed. The item of the physical server name is an area that stores therein the computer name of the server device 30 in which the VM guest 37 is running. The item of the log content is an area that stores therein information that indicates the content of the executed process. The "Memory error" in the item of the log content indicates that an error has occurred in a memory. Furthermore, the "Start failed" indicates that a startup of the VM guest 37 has failed. The "Stop failed" indicates that the stopping of the VM guest 37 has failed. The "Internal error" indicates that an abnormality has occurred in the VM guest 37. The "Cpu error" indicates that an abnormality has occurred in a CPU. For the item of the physical server name, instead of using a computer name, for example, an Internet Protocol (IP) address, a media access control (MAC) address, or the like may also be used.

In the example illustrated in FIG. 3, the record with the time stamp of "2010/12/11 at 12:31:42" indicates that the VM guest 37 is running on the server device 30 with the computer name of "Vmhost1" and indicates that a memory error has occurred. Furthermore, the record with the time stamp of "2010/12/13 at 10:02:33" indicates that the VM guest 37 is running on the server device 30 with the computer name of "Vmhost2" and indicates that the stopping of the VM guest 37 has failed.

A description will be given here by referring back to FIG. 2. The control unit 33 is an electronic circuit that has an internal memory, such as a CPU. The control unit 33a/33b includes the hypervisor 34a/34b, a transferring unit 35a/35b, and a retaining unit 36a/36b.

The hypervisor 34 is a control program for virtualization software that virtually implements an operating environment of a computer system. The hypervisor 34 controls the operation of the VM guests 37, which is virtual machines. In the example of FIG. 2, the hypervisor 34a of the serer device 30a controls the operation of VM guests 37a1, 37a2, 37a3 while the hypervisor 34b of the server device 30b controls the operation of VM guests 37b1 and 37b2. Furthermore, the hypervisor 34 controls, in accordance with a migration instruction received from the management server 40, the migration of the VM guests 37 with the other server devices 30. The VM guests 37 are virtual machines that execute a process requested by a user in an environment that is provided by the hypervisor 34. The VM guest 37 executes a program, such as an application or firmware, in a virtual environment and creates a log that indicates the history of a process executed by a virtual machine. The hypervisor 34 creates a file for each of the VM guests 37 and stores the log created by the VM guest 37 in the storing unit 32.

The transferring unit 35 is a program that is executed in, for example, the hypervisor 34, or a program that is executed in, for example, the same layer of the hypervisor 34 in the physical server. When the hypervisor 34 migrates the VM guest 37 to one of the server devices 30, the transferring unit 35 extracts a log of the VM guest 37 that is targeted for the migration from the storing unit 32. The transferring unit 35 transfers, to the server device 30 that is the transfer destination of the VM guest 37, the log extracted from the storing unit 32 together with the needed information. The timing at which the log is transferred may be during the migration or may me after the migration. When a log is transferred after the migration, the log may be transferred, for example, immediately after a migration process has been completed or may be transferred when, for example, the load, such as the CPU usage rate of the server devices 30 at the transfer source and the transfer destination, is lower than the allowance. When a log is transferred during the migration, the log can be promptly written at the move destination. When a log is transferred after migration, the load applied to the server devices 30 can be distributed. When the transferring of the log has been completed, the transferring unit 35 deletes, from the storing unit 32, the log that has been transferred.

FIG. 4 is a schematic diagram illustrating an example configuration of data in a log that is to be transferred. As illustrated in FIG. 4, the data in the transfer log includes items, such as the move source physical server name, the move VM guest name, and a log file. The item of the move source physical server name is an area that stores therein the computer name of the server device 30, which is the transfer source of a log. The item of the move VM guest name is an area that stores therein the name of the VM guest 37 that is to be moved. The item of the log file is an area that stores therein a log file of a log that is to be transferred.

In the example illustrated in FIG. 4, the transfer log information indicates that the computer name of the server device 30 at the move source is "VMhost1", the name of the VM guest 37 to be moved is "VM guest1", and the log file name is "VM guest1.log".

The retaining unit 36 is also a program that is executed in, for example, the hypervisor 34, or a program that is executed in, for example, the same layer of the hypervisor 34 in the physical server. The retaining unit 36 receives a log that is transferred in accordance with a migration of the VM guest 37 from one of the server devices 30 and retains the received log in the storing unit 32. At this point, for example, there may be a case in which a log has already been present in the storing unit 32 because the migrated VM guest 37 operates before the log is transferred. As in this case, if a log of the migrated VM guest 37 has already been present in the storing unit 32, the retaining unit 36 combines the log of the transferred VM guest 37 with the log of the VM guest 37 that has already been present in the storing unit 32 in this order and then stores the combined log in the storing unit 32. For example, the retaining unit 36 assigns a new name to the file name of the log that has already been present in the storing unit 32 or moves the log to another folder. Then, the retaining unit 36 additionally writes, into the received log, the content of the log whose name has been changed or the log that is moved to the other folder and then stores the log in the storing unit 32. Thereafter, the retaining unit 36 deletes, from the storing unit 32, the log whose name has been changed or the log that has been moved to the other folder.

As described above, by combining the log, which is related to the VM guest 37 and has already been present in the storing unit 32, after the transferred log of the VM guest 37, even if the time at which each of the physical servers executes the VM guest 37 varies, it is possible to maintain the order of the processes executed by the VM guests 37.

FIG. 5 is a schematic diagram illustrating an example of the result obtained by combining a transferred log with a log that has already been present in the storing unit. The structure of the log illustrated in FIG. 5 is the same as that illustrated in FIG. 3; therefore, a description thereof will be omitted. In the example illustrated in FIG. 5, the symbol represented by T1 indicates that the VM guest 37 migrates from the server device 30 named "Vmhost1" to the server device 30 named "Vmhost2". Furthermore, the symbol represented by T2 indicates that the VM guest 37 migrates from the server device 30 named "Vmhost2" to the server device 30 named "Vmhost3". The symbol represented by T3 indicates that the VM guest 37 migrates from the server device 30 named "Vmhost3" to the server device 30 named "Vmhost4". In the example illustrated in FIG. 5, the order of the logs indicated by the symbols represented by T1 and T2 is not the chronological order of the time stamp. However, by combining a log created by the VM guest 37 after a transferred log in accordance with the migration of the VM guest 37, because the order of the processes executed by the VM guests 37 can be maintained in the log, it is easy to analyze logs.

Configuration of the Management Server

As illustrated in FIG. 2, the management server 40 includes a communication control I/F unit 41, a storing unit 42, and a control unit 43.

The communication control I/F unit 41 is an interface that includes at least one port and controls communication between each of the server devices 30 and the management server 40. For example, the communication control I/F unit 41 sends a migration instruction related to the VM guest 37 to the server device 30. Furthermore, the communication control I/F unit 41 sends and receives various kinds of information related to the VM guest 37 to and from the hypervisor 34 in each of the server devices 30.

The storing unit 42 is a storage device, such as a semiconductor memory device, a hard disk, or the like, and stores therein information related to the hypervisor 34 and the VM guest 37 that are managed by the management server 40. For example, the storing unit 42 stores therein the IP address of the server device 30, the hypervisor 34 running on the server device 30, the status of the resources available in the hypervisor 34, the number of the VM guests 37 that are running, and the status of the resources available in the VM guests 37. The information stored in the storing unit 42 may be arbitrary changed. Furthermore, the information may also be registered or updated by an administrator or may also be periodically acquired from each of the server devices 30.

The control unit 43 is an electronic circuit that has an internal memory, such as a CPU, and includes a VM guest management unit 44 and a VM guest move instruction unit 45.

The VM guest management unit 44 sends and receives various kinds of information related to the VM guest 37 to and from the hypervisor 34 in each of the server devices 30 and then updates the information related to the hypervisor 34 and the VM guest 37 stored in the storing unit 42.

When the VM guest move instruction unit 45 moves the VM guest 37 running on the server device 30 to one of the other server devices 30, the VM guest move instruction unit 45 sends a migration instruction to the server device 30 at the move source.

Figure 6:
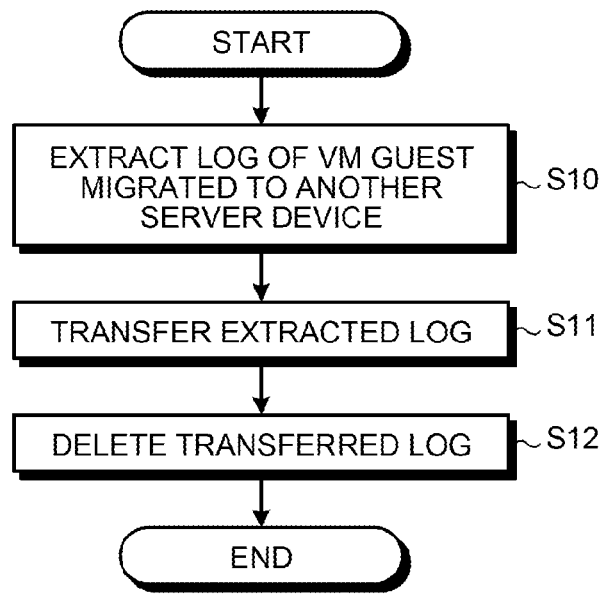
FIG. 6 is a flowchart illustrating the flow of a log transfer process.

In the following, a description will be given of the flow of a process in which the server device 30 according to the second embodiment transfers a log in accordance with a migration of the VM guest 37. FIG. 6 is a flowchart illustrating the flow of a log transfer process. The log transfer process is executed at the timing at which, for example, the VM guest 37 is migrated to one of the other server devices 30.

As illustrated in FIG. 6, the transferring unit 35 extracts, from the storing unit 32, the log of the VM guest 37 that has been migrated to one of the other server devices 30 (Step S10). Then, the transferring unit 35 transfers, to the server device 30 at transfer destination of the VM guest 37, the log extracted from the storing unit 32 together with needed information (Step S11). After the transferring of the log has been completed, the transferring unit 35 deletes, from the storing unit 32, the log that has been transferred (Step S12).

Figure 7:
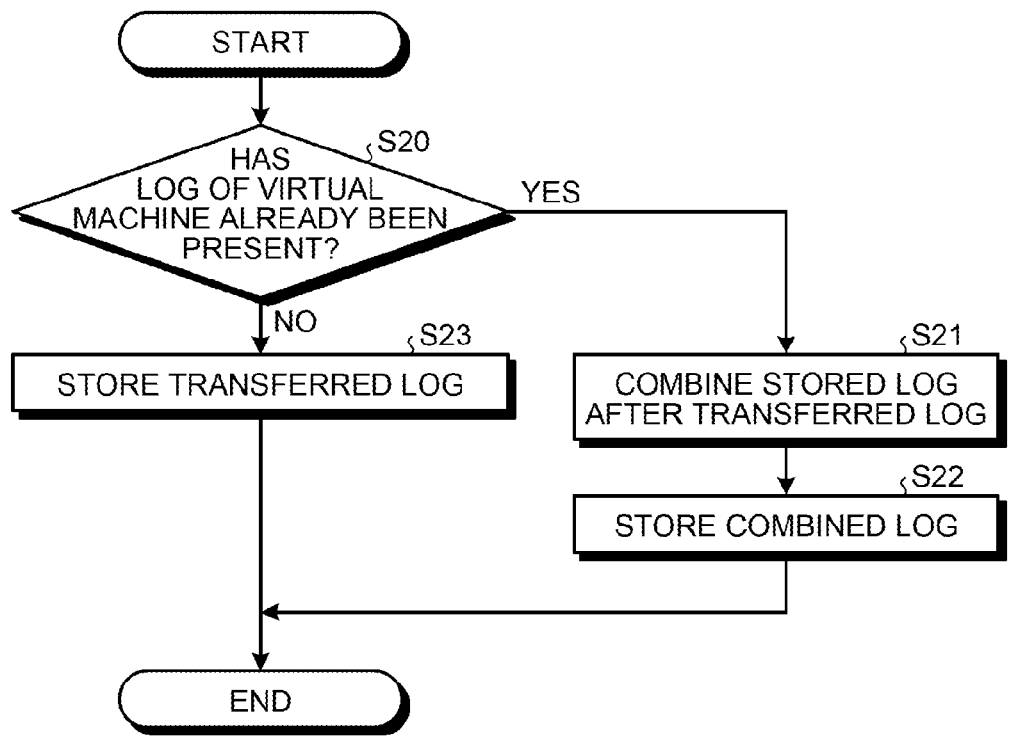
FIG. 7 is a flowchart illustrating the flow of a log retaining process.

In the following, a description will be given of the flow of a process in which the server device 30 according to the second embodiment stores the log that is transferred from one of the other server devices 30 in accordance with the migration of the VM guest 37. FIG. 7 is a flowchart illustrating the flow of a log retaining process. The log retaining process is executed at the timing at which, for example, a log of the VM guest 37 is received from one of the other server devices 30.

As illustrated in FIG. 7, the retaining unit 36 determines whether the log of the VM guest 37 that has created the received log has already been present in the storing unit 32 (Step S20). When the log is present in the storing unit 32 (Yes at Step S20), the retaining unit 36 combines the log that is related to the VM guest 37 and that has already been present in the storing unit 32 after the transferred log of the VM guest 37 (Step S21). Then, the retaining unit 36 stores the combined log in the storing unit 32 (Step S22). In contrast, if the log is not present in the storing unit 32 (No at Step S20), the retaining unit 36 stores the received log in the storing unit 32 (Step S23).

As described above, when the log of the VM guest 37 that was migrated from one of the other server devices 30 has already been present in the storing unit 32, the server device 30 combines the log created by the VM guest 37 after the transferred log and then the combined log in the storing unit 32. Consequently, even if the time at which each of the server devices 30 executes the VM guest 37 varies, because the order of the processes executed by the VM guests 37 can be maintained in the log stored in the storing unit 32, the log can be easily analyzed.

[c] Third Embodiment

Figure 8:
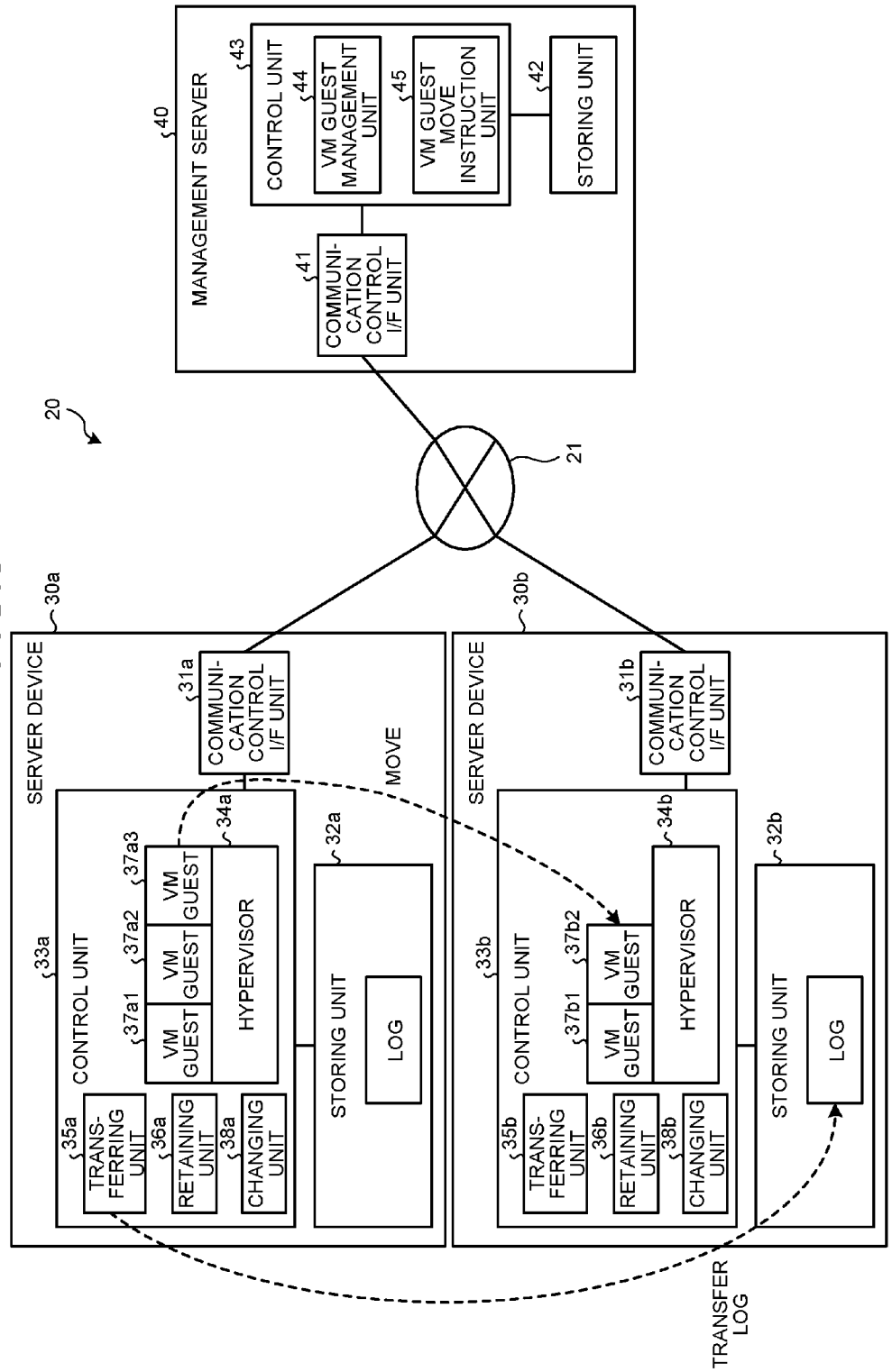
FIG. 8 is a schematic diagram illustrating an example of the functional configuration of a system according to a third embodiment.

In the following, a third embodiment will be described. In the third embodiment, a description will be given of a case in which, when the server device 30 transfers a log to one of the other server devices 30 in accordance with a migration of a virtual machine, the server device 30 changes the file name of the log and then transfers the log. FIG. 8 is a schematic diagram illustrating an example of the functional configuration of a system according to a third embodiment. Because the configuration of the system according to the third embodiment illustrated in FIG. 8 is substantially the same as that of the system in the second embodiment illustrated in FIG. 2, components having the same function are assigned the same reference numerals; therefore, a description thereof will be omitted and differences between the second embodiment and the third embodiment will be described below.

The server devices 30a/30b further includes a changing unit 38a/38b. When the VM guest 37 is migrated to one of the other server devices 30, the changing unit 38 changes the file name of the log of the VM guest 37 targeted for the migration in the storing unit 32 to the name of the log to which numbers are sequentially attached in the ascending order starting from the latest log is attached.

Figure 9:
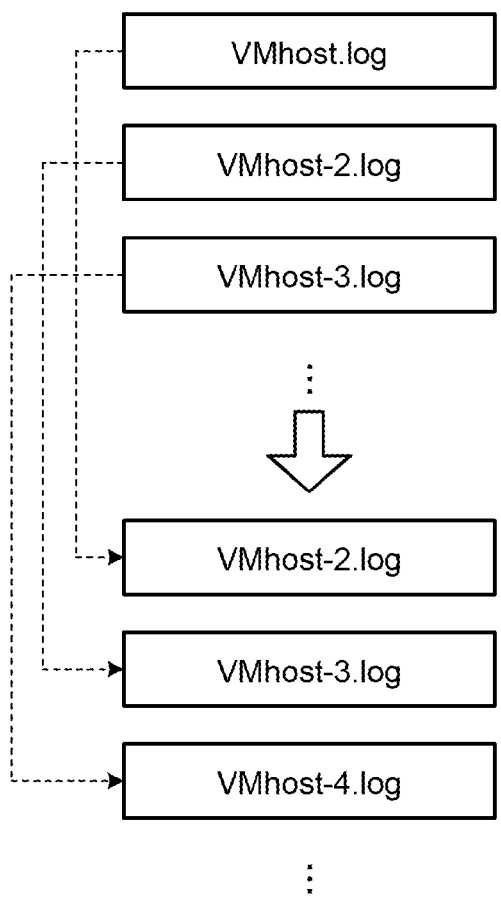
FIG. 9 is a schematic diagram illustrating a change in the name of log files.

FIG. 9 is a schematic diagram illustrating a change in the name of log files. As illustrated in FIG. 9, it is assumed that, as the log of the VM guest 37 that is to be migrated, logs with the file names of "VMhost.log", "VMhost-2.log", and "VMhost-3.log" are stored in the latest order in the storing unit 32. In this example, the changing unit 38 changes the file name of the log from "VMhost-3.log" to "VMhost-4.log", changes the file name of the log from "VMhost-2.log" to "VMhost-3.log", and changes the file name of the log from "VMhost.log" to "VMhost-2.log".

The transferring unit 35 transfers the log whose file name has been changed by the changing unit 38 is transferred to one of the other server devices 30.

Figure 10:
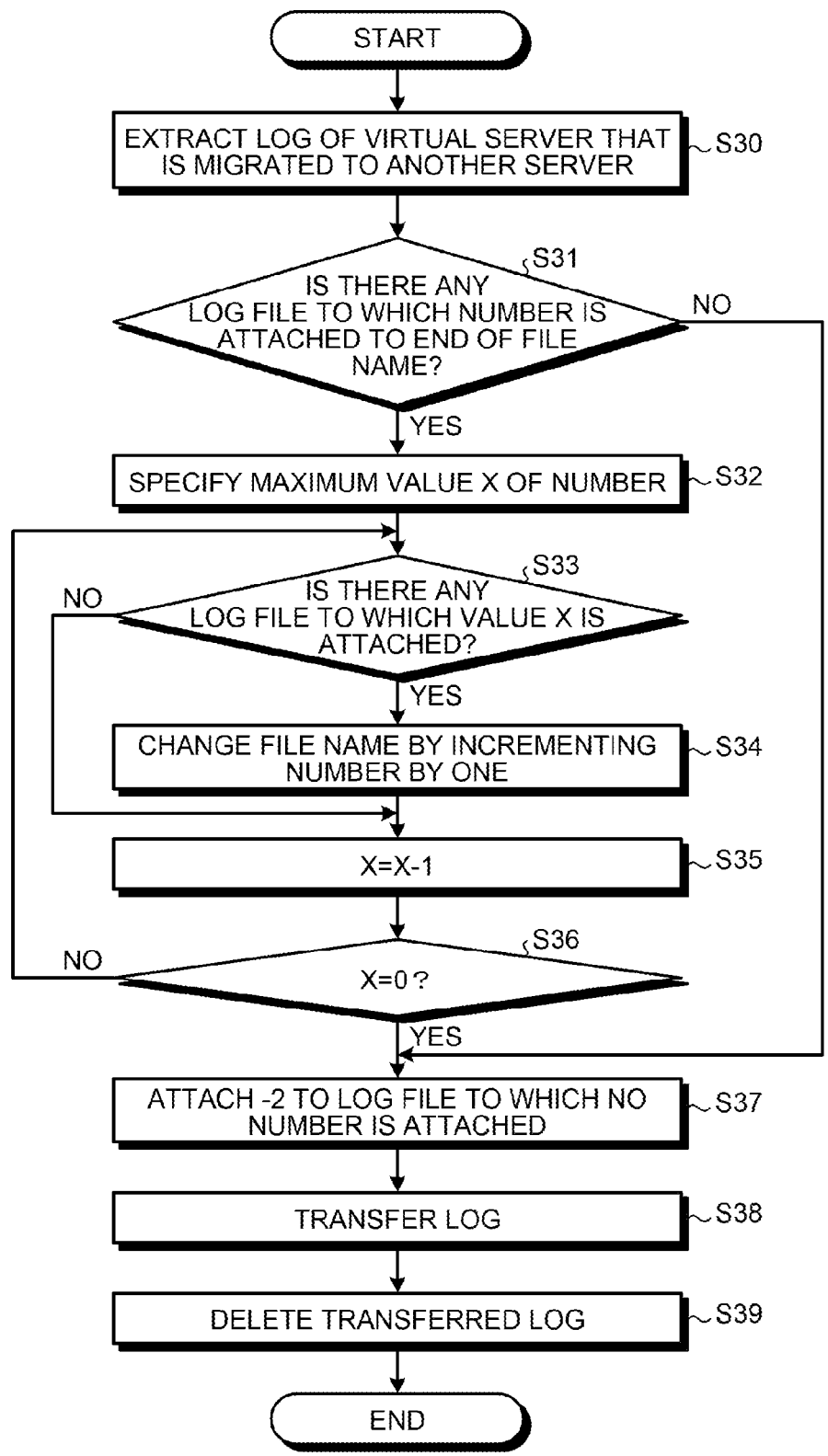
FIG. 10 is a flowchart illustrating the flow of a log transfer process.

FIG. 10 is a flowchart illustrating the flow of a log transfer process. As illustrated in FIG. 10, the changing unit 38 extracts, from the storing unit 32, the log of the VM guest 37 that was migrated to one of the other server devices 30 (Step S30). The changing unit 38 determines whether a log to which a number is attached to the end of the file name excluding its extension is present in the log extracted from the storing unit 32 (Step S31). If no log to which a number is attached is present (No at Step S31), the process proceeds to Step S37, which will be described later. In contrast, if a log to which a number is attached is present (Yes at Step S31), the changing unit 38 specifies the maximum value X from among the attached number (Step S32). The changing unit 38 determines whether a log to which the value of X is attached to the end of the file name excluding its extension is present in the log extracted from the storing unit 32 (Step S33). If the log to which the value of X is attached is present (Yes at Step S33), the changing unit 38 changes the file name of the log by incrementing the value of X that is attached to the end of the file name excluding its extension by one (Step S34). Then, the changing unit 38 decrements the value of X by one (Step S35). In contrast, if no log to which the value of X is attached is present (No at Step S33), the changing unit 38 executes the process at Step S35. Then, the changing unit 38 determines whether the value of X is zero (Step S36). If the value of X is not zero (No at Step S36), the changing unit 38 proceeds to Step S33. In contrast, if the value of X is zero (Yes at Step S36), the changing unit 38 attaches a hyphen and the number "2" to the end of the file name of the log that has no attached number at the end of the file name excluding its extension (Step S37). The transferring unit 35 transfers the log whose file name has been changed by the changing unit 38 to the server device 30, which is the transfer destination of the VM guest 37, together with needed information (Step S38). After the transferring of the log has been completed, the transferring unit 35 delete, from the storing unit 32, the log that has been transferred (Step S39).

As described above, when the server device 30 migrates the VM guest 37 to one of the other server devices 30, the server device 30 changes the file name of the log of the VM guest 37, which is to be migrated, in the storing unit 32 to the new name that is obtained by sequentially attaching numbers in the ascending order to newly received logs and then transfers the log. Consequently, in the server device 30 at the transfer destination, even if the log of the VM guest 37 has already been present in the storing unit 32, the names of the logs are not overlapped. Furthermore, because the order of the created logs can be identified from the number that is sequentially attached to each of the file names, the log can be easily analyzed.

[d] Fourth Embodiment

Figure 11:
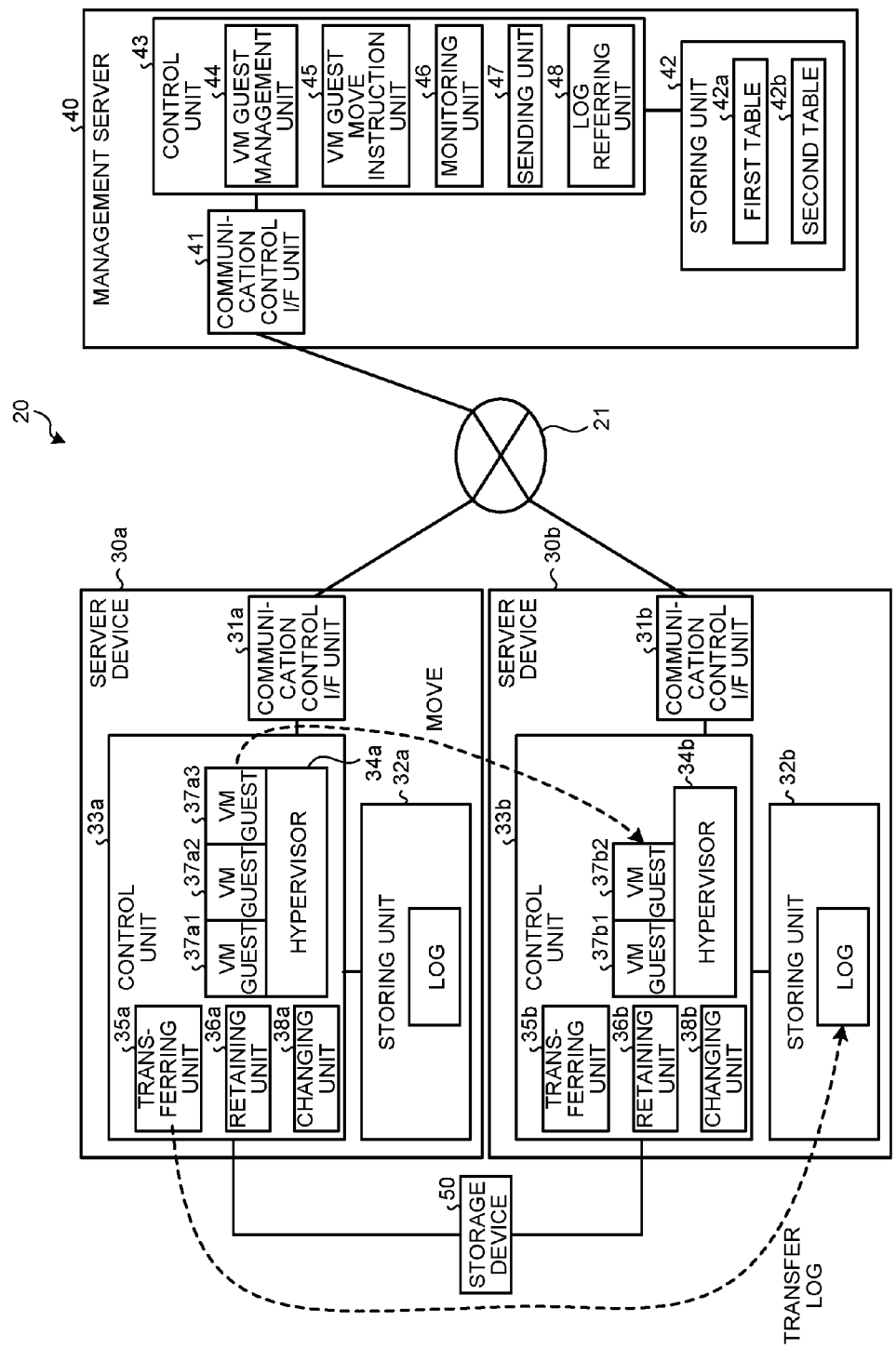
FIG. 11 is a schematic diagram illustrating an example of the functional configuration of a system according to a fourth embodiment.

In the following, a fourth embodiment will be described. In the fourth embodiment, a description will be given of a case in which a log of a virtual machine is not moved in accordance with a migration of the VM guest 37 and a case in which the management server 40 transfers a log to the server device 30 at the move source. FIG. 11 is a schematic diagram illustrating an example of the functional configuration of a system according to a fourth embodiment. Because the configuration of the system according to the fourth embodiment illustrated in FIG. 11 is substantially the same as that of the system in the third embodiment illustrated in FIG. 8, components having the same function are assigned the same reference numerals; therefore, a description thereof will be omitted and differences between the third embodiment and the fourth embodiment will be described below.

Similarly to the third embodiment, each of the server devices 30 according to the fourth embodiment stores, in the storing unit 32, a log with the file name to which a number is sequentially attached in the ascending order to the latest logs of the VM guest 37.

Furthermore, the server device 30 is connected to a storage device 50, such as an external disk array device or the like, and shares the storage device 50. The storage device 50 stores therein information that is written by the server device 30. The server device 30 stores, in the storage device 50, information related to each of the VM guests 37.

At this point, a virtual machine virtually constructed in a physical server stores all pieces of information related to the virtual machine in a file and executes the file on another physical server, thereby executing migration. In the fourth embodiment, by reading information related to the VM guest 37 in one of the other server devices 30 stored in the storage device 50 and executing the read information in the hypervisor 34, the server device 30 can execute a migration.

Because the migration can be executed by reading the information related to the VM guest 37 stored in the storage device 50 and by executing the read information in the hypervisor 34, there may sometimes be a case in which the log of the migrated VM guest 37 is not transferred. For example, when the server device 30 at the transfer source is stopped, the log is not transferred from the transfer source. If the log of the migrated VM guest 37 is not transferred, the server device 30 notifies the management server 40 that the log has not yet been transferred. The notification sent to the management server 40 indicating that the log has not yet been transferred is performed when, for example, the log is not transferred within a predetermined time period after the migration has been completed or is performed when, for example, the server device 30 at the transfer source is presumed to be stopped due to no response being received after communication is performed with the server device 30 at the transfer source.

FIG. 12 is a schematic diagram illustrating an example configuration of communication data by which a log that has not been transferred is notified. As illustrated in FIG. 12, the notification indicating that a log has not yet been transferred includes items of the move VM guest name and the move source physical server name. The item of the move VM guest name is an area that stores therein the name of the VM guest 37 that is to be moved. The item of the move source physical server name is an area that stores therein the computer name of the server device 30 at the transfer source that is targeted for the transferring of the log that is not able to be transferred.

In the example illustrated in FIG. 12, the notification of a not-yet transferred log indicates that the name of the VM guest 37 to be moved is "VM guest1" and the computer name of the server device 30 at the transfer source to which the log is not able to be transferred is "VMhost2".

In contrast, as illustrated in FIG. 11, the storing unit 42 in the management server 40 stores therein a first table 42a and a second table 42b.

The first table 42a is a table that manages the move history for each of the VM guests 37. FIG. 13 is a schematic diagram illustrating an example configuration of data in a first table. As illustrated in FIG. 13, the first table 42a includes items, such as the record identification (ID), the VM guest ID, the physical server name, and the pre-move record ID before a move.

The item of the record ID is an area that stores therein the identification number that is used to identify the history. The item of the VM guest ID is an area that stores therein the identification number that is used to identify each of the VM guests 37. The item of the physical server name is an area that stores therein the computer name of the physical server in which the VM guest 37 is running. The item of the pre-move record ID is an area that stores therein the past record ID before the move. If the pre-move record is not present, "-" is stored in the item of the pre-move record ID.

In the example illustrated in FIG. 13, the record IDs "1", "2", "4", and "5" are the move histories of the VM guest 37 with the VM guest ID of "100". The record ID "5" indicates that the VM guest 37 with the VM guest ID of "100" is running in the physical server with the computer name of "A" and indicates that the past record ID, i.e., the pre-move record ID, is "4". The record ID "4" indicates that the VM guest 37 with the VM guest ID of "100" is running in the physical server with the computer name of "B" and indicates that the pre-move past record ID is "2". The record ID "2" indicates that the VM guest 37 with the VM guest ID of "100" is running in the physical server with the computer name of "A" and indicates that the pre-move past record ID is "1". The record ID "1" indicates that the VM guest 37 with the VM guest ID of "100" is running in the physical server with the computer name of "B" and indicates that pre-move history is not present. Specifically, in the example illustrated in FIG. 13, the VM guest 37 with the VM guest ID of "100" has moved through the physical servers in the order of "A"→"B"→"A".

Furthermore, in the example illustrated in FIG. 13, the record IDs "3" and "7" are the move histories of the VM guest 37 with the VM guest ID of "101". The record ID "7" indicates that the VM guest 37 with the VM guest ID of "101" is running in the physical server with the computer name of "B" and indicates that the pre-move past record ID is "3". The record ID "3" indicates that the VM guest 37 with the VM guest ID of "100" is running in the physical server with the computer name of "A" and indicates that the pre-move history is not present. Specifically, in the example illustrated in FIG. 13, the VM guest 37 with the VM guest ID of "101" has moved through the physical server from "A" to "B".

Furthermore, in the example illustrated in FIG. 13, the record ID "6" indicates that the VM guest 37 with the VM guest ID of "102" is running in the physical server with the computer name of "B" and indicates that the pre-move history is not present. Specifically, the example illustrated in FIG. 13 indicates that the VM guest 37 with the VM guest ID of "102" is running in the physical server named "B" and has no history of moving to the other physical servers.

The second table 42b is a table that manages currently operating physical servers for each of the VM guests 37. FIG. 14 is a schematic diagram illustrating an example configuration of data in a second table. As illustrated in FIG. 14, the second table 42b includes items, such as the record ID, the VM guest ID, the physical server name, and the latest history record ID.

The item of the record ID is an area that stores therein the identification number that is used to identify each record. The item of the VM guest ID is an area that stores therein the identification number that is used to identify each of the VM guests 37. The item of the physical server name is an area that stores therein the computer name of the physical server in which the VM guest 37 is running. The item of the latest history record ID is an area that stores therein the record ID of the latest move history in the first table 42a.

In the example illustrated in FIG. 14, the record ID "1" indicates that the VM guest 37 with the VM guest ID of "100" is running in the physical server named "A" and indicates that the latest history record ID in the first table 42a is "5". The record ID "2" indicates that the VM guest 37 with the VM guest ID of "101" is running in the physical server named "B" and indicates that the latest history record ID in the first table 42a is "7". The record ID "3" indicates that the VM guest 37 with the VM guest ID of "102" is running in the physical server named "B" and indicates that the latest history record ID in the first table 42a is "6".

A description will be given here by referring back to FIG. 11. The management server 40 further includes a monitoring unit 46, a sending unit 47, and a log referring unit 48.

When the VM guest move instruction unit 45 moves the VM guest 37 running in the server device 30 to one of the other server devices 30, the VM guest move instruction unit 45 sends, to the server device 30 at the move source and the server device 30 at the move destination, a migration instruction that includes the VM guest 37 that is targeted for a move.

The VM guest management unit 44 updates the first table 42a and the second table 42b to the latest state. For example, the VM guest management unit 44 adds, into the first table, the record of the VM guest ID indicated by the identification number of the VM guest 37 that is to be moved, the record of the physical server name indicated by the computer name of the server device 30 at the move destination, and the record of the move source indicated by the latest record ID of the VM guest 37. Furthermore, the VM guest management unit 44 updates the physical server name associated with the record of the VM guest 37, which is to be moved, in the first table 42a to the computer name of the server device 30 at the move destination and updates the latest history record ID to the record ID of the record that is added to the first table.

If a notification is received from the server device 30 indicating that a log has not yet been transferred, the monitoring unit 46 monitors the state of the server device 30 at the move source. For example, the monitoring unit 46 periodically communicates with the server device 30 at the move source and monitors whether the server device 30 at the move source is stopped or is in an active state.

If the monitoring result performed by the monitoring unit 46 indicates that the server device 30 at the move source is in an active state, the sending unit 47 sends a move instruction related to a log to the server device 30 at the move source. The server device 30 that has been received the move instruction related to the log transfers the log by executing the log transfer process that has been described in the second embodiment.

FIG. 15 is a schematic diagram illustrating an example configuration of communication data by which a move instruction is performed. As illustrated in FIG. 15, the move instruction includes items, such as the move VM guest name and the move destination physical server name. The item of the move VM guest name is an area that stores therein the name of the VM guest 37 to be moved. The item of the move destination physical server name is an area that stores therein the computer name of the server device 30 at the transfer destination for the log.

In the example illustrated in FIG. 15, the move instruction indicates that the name of the VM guest 37 to be moved is "VM guest1" and the computer name of the server device 30 at the transfer destination for the log is "VMhost2".

A description will be given here by referring back to FIG. 11. The log referring unit 48 receives information indicating that the VM guest 37 that is targeted for the referring of its log is specified. This information may also be received by displaying, for example, on a display unit (not illustrated) in the management server 40, a screen for specifying the VM guest 37 to be referred to and by receiving an input on the specified screen from an input unit (not illustrated). Furthermore, the information may also be received by displaying, for example, on a display unit in a terminal device, such as a client computer, via the network 21, a screen for specifying the VM guest 37 and by receiving an input on the specified screen from an input unit in the terminal device.

The log referring unit 48 refers to the log by accessing to the log of the specified VM guest 37. For example, when an administrator who checks the log specifies the VM guest 37 that is referred to by the administrator, the log referring unit 48 acquires, from the first table 42a stored in the storing unit 42, the move history of the VM guest 37 to be referred to. Then, the log referring unit 48 connects to the server device 30 with the physical server name that is in the end of the move history and accesses to the actual log. Logs are sorted for each migration of the VM guest 37. Numbers are sequentially attached to the file names of the logs in the ascending order from the latest logs. By reading the log in the ascending numerical order attached to the file name, the log referring unit 48 can read the logs in the order they have been processed. Furthermore, the order of the physical servers in the move history is associated to the order of the number attached to the file name. Consequently, by reading the log file associated with the order of the physical servers, the log referring unit 48 can extract the log of a specific physical server and refer to the extracted log.

Figure 16:
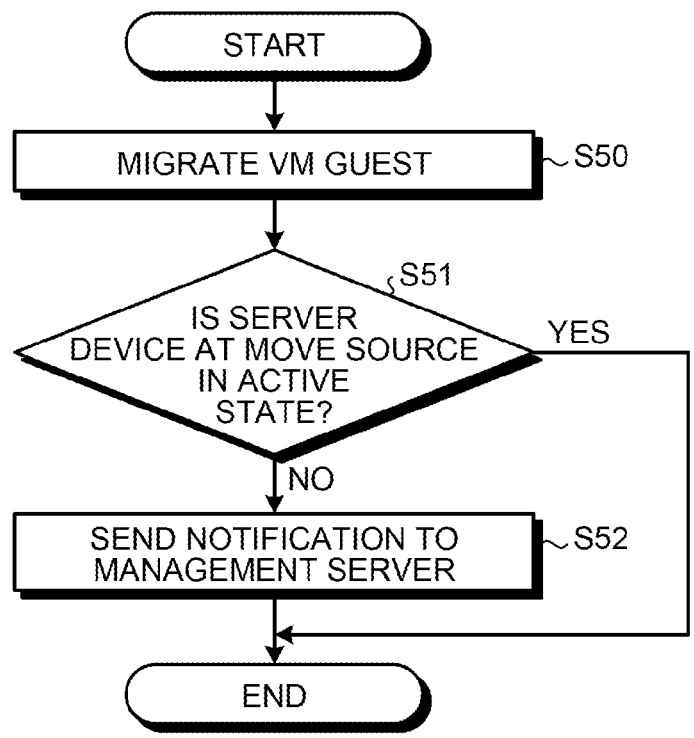
FIG. 16 is a flowchart illustrating the flow of a migration process.

In the following, a description will be given of the flow of a process in which the server device 30 at the move destination according to the fourth embodiment migrates the VM guest 37. FIG. 16 is a flowchart illustrating the flow of a migration process. This log transfer process is executed at the timing at which, for example, an instruction to migrate the VM guest 37 is received.

By reading the information related to the migration of the VM guest 37 from the storage device 50 and executing the migration, the hypervisor 34 migrates the VM guest 37 (Step S50). The control unit 33 determines whether the server device 30 at the move source of the VM guest 37 is in an active state (Step S51). In contrast, the server device 30 at the move source is not in an active state (No at Step S51), the control unit 33 notifies the management server 40 that a log has not yet been transferred (Step S52). In contrast, when the server device 30 at the move source is in an active state (Yes at Step S51), the control unit 33 ends the process.

Figure 17:
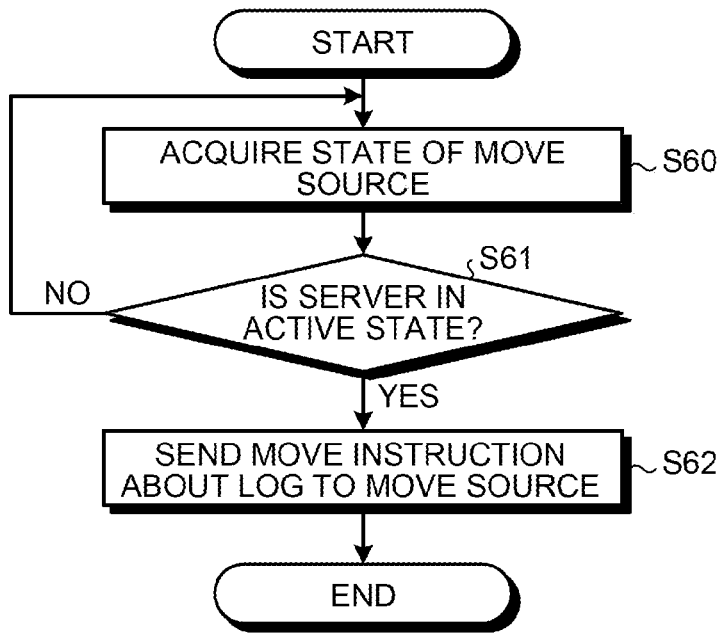
FIG. 17 is a flowchart illustrating the flow of a monitoring process.

In the following, the flow of the process in which the management server 40 according to the fourth embodiment monitors the server device 30 will be described. FIG. 17 is a flowchart illustrating the flow of a monitoring process. The log transfer process is executed at the timing at which, for example, a notification is received from one of the server devices 30 indicating that a log has not yet been transferred.

The monitoring unit 46 acquires the state of the server device 30 at the move source indicated by communication data in the notification indicating that a log has not yet been transferred (Step S60). The monitoring unit 46 determines whether the state of the server device 30 at the move source is in an active state (Step S61). If the state of the server device 30 at the move source is not in an active state (No at Step S61), the monitoring unit 46 proceeds to Step S60 and continues to monitor the state. In contrast, if the state of the server device 30 at the move source is in an active state (Yes at Step S61), the sending unit 47 sends a move instruction related to a log to the server device 30 at the move source (Step S62). The server device 30 that has received the move instruction related to the log transfers the log to the server device 30 at the transfer destination indicated by the communication data in the move instruction.

Figure 18:
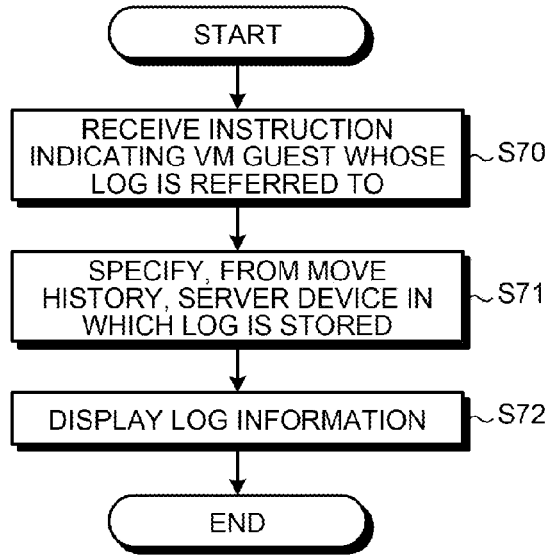
FIG. 18 is a flowchart illustrating the flow of a referring process.

In the following, a description will be given of the flow of a process in which a log of the server device 30 is referred to by the management server 40 according to the fourth embodiment. FIG. 18 is a flowchart illustrating the flow of a referring process. This referring process is executed at the timing at which, for example, an instruction to refer to the log is received.

The log referring unit 48 receives an instruction indicating that a log of the VM guest 37 needs to be referred to (Step S70). Then, the log referring unit 48 acquires, from the first table 42a stored in the storing unit 42, the move history to be referred to and then specifies the server device 30 with the physical server name at the end in the move history (Step S71). The log referring unit 48 connects to the specified server device 30, accesses each log file on the basis of the move history, and then displays the log (Step S72).

As described above, if a log of the VM guest 37 is not moved in accordance with a migration of the VM guest 37, the management server 40 monitors the state of the server device 30 at the move source. If the result of the monitoring indicates that the server device 30 at the move source is in an active state, the management server 40 sends a move instruction related to a log to the server device 30 at the move source. The server device 30 at the move source receives the move instruction, the server device 30 transfers, to the server device 30 at the transfer destination, the log that is stored in the storing unit 32 and that is created by the migrated VM guest 37. The server device 30 at the transfer destination stores the log transferred to the storing unit 32 that stores therein the log created by a migrated virtual machine. Consequently, with the management server 40, even when the server device 30 at the move source stops its operation and is not able to transfer a log, the log can be transferred later.

[e] Fifth Embodiment

In the above explanation, a description has been given of the embodiments of the device according to the present invention; however, the present invention can be implemented with various kinds of embodiments other than the embodiments described above. Therefore, another embodiment included in the present invention will be described below.

For example, in the second to the fourth embodiments, a description has been given of a case in which, in addition to the hypervisor 34, the transferring unit 35, the retaining unit 36, and the changing unit 38 are installed; however, the device according to the present invention is not limited thereto. For example, the hypervisor 34 may also have the function performed by the transferring unit 35, the retaining unit 36, and the changing unit 38.

Furthermore, in the second to the fourth embodiments, a description has been given of a case in which, the management server 40 receives, from the server device 30, a notification indicating that a log has not been transferred, whereby the management server 40 determines that the log has not been moved; however, the device according to the present invention is not limited thereto. For example, the management server 40 periodically monitors a state of each of the server devices 30. When the server device 30 that is not in an active state migrates a device that is the source of the log, the management server 40 may also determine that the log has not been moved. Furthermore, for example, when at least one of the server devices 30 at the move source and the move destination for the migration notifies the management server 40 of the result of the migration, if the result indicates an abnormality or if the result is not sent as a notification, the management server 40 may also determine that the log has not been moved.

Furthermore, in the second to the fourth embodiments, a description has been given of a case in which, in addition to the hypervisor 34, the transferring unit 35, the retaining unit 36, and the changing unit 38 are installed; however, the device according to the present invention is not limited thereto. For example, the hypervisor 34 may also have the function performed by the transferring unit 35, the retaining unit 36, and the changing unit 38.

Furthermore, the processes performed at steps described in each embodiment may be separated or integrated depending on various loads or use conditions. Furthermore, it may also possible to omit a step.

The components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. For example, the hypervisor 34 may also be integrated with the transferring unit 35 illustrated in FIG. 2, the hypervisor 34 may also be integrated with the retaining unit 36, or the hypervisor 34, the transferring unit 35, and the retaining unit 36 may also be integrated. Furthermore, the changing unit 38 illustrated in FIG. 8 may also further be integrated with the hypervisor 34, the transferring unit 35, and the retaining unit 36. Furthermore, all or any part of the processing functions performed by each device can be implemented by a CPU and by programs analyzed and executed by the CPU or implemented as hardware by wired logic.

Log Transferring Program

Figure 19:
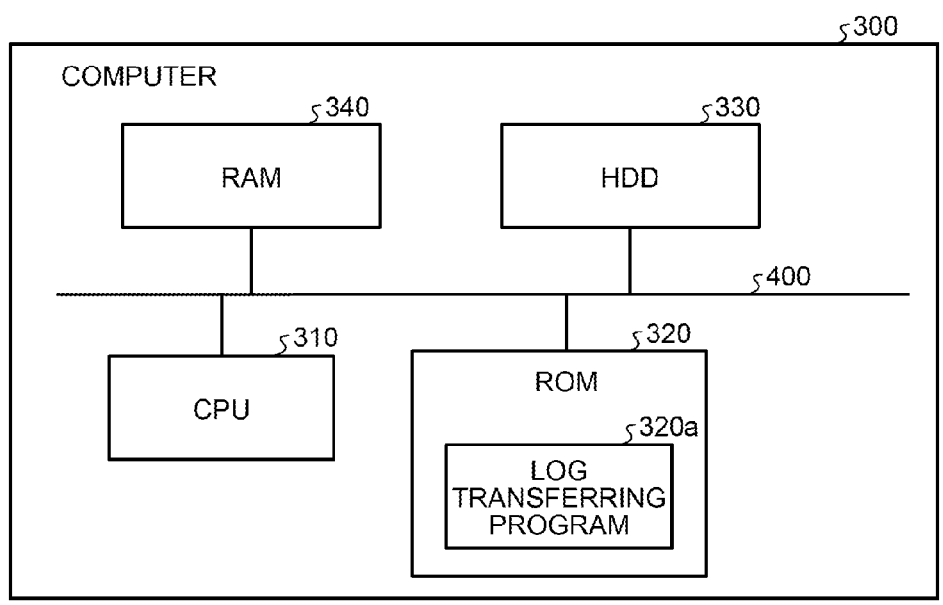
FIG. 19 is a block diagram illustrating a computer that executes a log transferring program.

Furthermore, various processes described in the above embodiments can be implemented by program prepared in advance and executed by a computer system, such as a personal computer or a workstation. Accordingly, in the following, a description will be given of an example of a computer system that executes a program having the same function as that performed in the embodiments described. FIG. 19 is a block diagram illustrating a computer that executes a log transferring program.

As illustrated in FIG. 19, a computer 300 includes a central processing unit (CPU) 310, a read only memory (ROM) 320, a hard disk drive (HDD) 330, and a random access memory (RAM) 340. The units 300 to 340 are connected with each other via a bus 400. The HDD 330 stores therein a log of a virtual machine that is obtained from virtualization of a computer.

The ROM 320 stores therein, in advance, a log transferring program 320*a* that is the same function as that performed by the virtualization control unit 13 and the transferring unit 15 described in the first embodiment or the same function as that performed by the hypervisor 34, the transferring unit 35, the retaining unit 36, and the changing unit 38 described in the second to the fourth embodiments. The log transferring program 320*a* may also be appropriately separated.

Then, the CPU 310 reads the log transferring program 320*a* from the ROM 320 and executes the log transferring program 320*a* so that the log transferring program 320*a* executes the same operation as that executed by each of the control units described in the first to the fourth embodiments. Specifically, the log transferring program 320*a* executes the same operation as that executed by the transferring unit 15 described in the first embodiment or executes the same operation as that executed by the transferring unit 35, the retaining unit 36, and the changing unit 38 described in the second to the fourth embodiments.

Furthermore, the log transferring program 320*a* does not need to be initially stored in the ROM 320.

For example, the program is stored in a "portable physical medium", such as a flexible disk (FD), a CD-ROM, a DVD disk, a magneto-optic disk, or an IC CARD, that is to be inserted into the computer 300. Then, the computer 300 may read and execute the program from the portable physical medium.

Alternatively, the program may also be stored in "another computer (or a server)" connected to the computer 300 via a public circuit, the Internet, a LAN, a WAN, or the like. Then, the computer 300 may also read and execute the program from the other computer.

According to an aspect of an embodiment of the present invention, an advantage is provided in that it is possible to easily check a log of a virtual machine.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have) been described in detail, it should be understood that the various changes, substitutions, and alterations could be made hereto without departing from the spirit and scope of the invention.

What is claimed is:

1. A log transferring system comprising:
a monitoring server device that includes
  a monitoring unit that monitors, when a log created by a virtual machine has not been moved from a first server device to a second server device in accordance with a migration of the virtual machine from the first server device to the second server device, a state of the first server device, and
  a sending unit that sends, when a result of the monitoring of the monitoring unit indicates that the first server device is in an active state, a move instruction to the first server device, the move instruction instructing to move the log created by the virtual machine from the first server device to the second server device;
the first server device includes
  a first storing unit that stores therein the log created by the virtual machine that has been migrated to the second server device, and
  a transferring unit that transfers, to the second server device when the move instruction is received, the log, which is stored in the first storing unit, of the virtual machine that has been migrated to the second server device; and
the second server device includes
  a second storing unit that stores therein a log created by the virtual machine after the migration from the first server device to the second server device, and
  a retaining unit that retains, in the second storing unit, the log transferred by the transferring unit.

2. The log transferring system according to claim 1, wherein
  the first server device further comprises a changing unit that changes, when the virtual machine is migrated to the second server device, a file name of the log of the virtual machine stored in the first storing unit to a name to which numbers are sequentially attached in an ascending order starting from a latest log, and
  the transferring unit transfers, to the second server device, the log of the virtual machine whose file name has been changed by the changing unit.

3. The log transferring system according to claim 1, wherein the retaining unit combines the log transferred by the transferring unit with the log created by the virtual machine after the migration and stored in the second storing unit and retains the combined log in the second storing unit.

* * * * *